(12) United States Patent
Philipp (10) Patent No.: US 8,109,380 B2
(45) Date of Patent: Feb. 7, 2012

(54) INTERMEDIATE STORAGE FOR BULK GOODS

(75) Inventor: Kurt Philipp, Grenzach-Wyhlen (DE)

(73) Assignee: Rotzinger AG, Kaiseraugst (CH)

(*) Notice: Subject to any disclaimer, the term of this patent is extended or adjusted under 35 U.S.C. 154(b) by 12 days.

(21) Appl. No.: 12/867,831

(22) PCT Filed: Feb. 12, 2009

(86) PCT No.: PCT/EP2009/051662
§ 371 (c)(1),
(2), (4) Date: Aug. 16, 2010

(87) PCT Pub. No.: WO2009/101152
PCT Pub. Date: Aug. 20, 2009

(65) Prior Publication Data
US 2010/0307889 A1 Dec. 9, 2010

(30) Foreign Application Priority Data

Feb. 14, 2008 (CH) ..................................... 0206/08

(51) Int. Cl.
*B65G 37/00* (2006.01)

(52) U.S. Cl. .................................. 198/347.1; 198/797

(58) Field of Classification Search ............... 198/347.1, 198/710, 711, 712, 797, 798
See application file for complete search history.

(56) References Cited

U.S. PATENT DOCUMENTS

| 5,636,722 A * | 6/1997 | Koop .......................... 198/347.1 |
| 5,788,057 A | 8/1998 | Walser et al. |
| 6,227,347 B1 * | 5/2001 | Bryant et al. ............... 198/347.1 |
| 6,517,306 B1 * | 2/2003 | Budny et al. ............... 198/347.1 |
| 2004/0089518 A1 * | 5/2004 | Irish ........................... 198/347.1 |
| 2006/0201785 A1 * | 9/2006 | Moeller ...................... 198/347.1 |
| 2006/0257236 A1 * | 11/2006 | Stingel et al. .............. 198/347.1 |

FOREIGN PATENT DOCUMENTS
DE 44 00 925 7/1995

OTHER PUBLICATIONS

International Search Report issued May 19, 2009 in PCT/EP09/51662 filed Feb. 12, 2009.
U.S. Appl. No. 13/140,661, filed Jun. 17, 2011, Philipp.

* cited by examiner

*Primary Examiner* — James R Bidwell
(74) *Attorney, Agent, or Firm* — Oblon, Spivak, McClelland, Maier & Neustadt, L.L.P.

(57) ABSTRACT

An intermediate storage including an intake station and an output station, two vertical conveyors, and two horizontal conveyors forming a conveying circuit with the two vertical conveyors. All conveyors are in a form of chain conveyors. The two vertical conveyors each include chains including catches and are arranged in pairs, each with an individual chain drive. Level differences which occur in operation between transferring edgers of unit load suppliers and carrier plates can be identified and corrected immediately. To keep a mutual gap between successive gondolas small, the gondola of a gondola pair that is running ahead is deflected sideways in the region of the deflection. A collision with the following gondola is thus reliably avoided.

5 Claims, 6 Drawing Sheets

INTERMEDIATE STORAGE FOR BULK GOODS

The invention concerns an intermediate storage which works on the first-in-first-out principle, according to the pre-characterizing clause of the independent Claim 1.

DESCRIPTION

Such storages are preferably used between production and packing in the food industry, in particular in production of chocolate bars and biscuits. These storages are also used to load packing machines continuously and without gaps. If there is an interruption in the downstream packing system, production can continue, since the storage can then receive the accumulating products. The storage is thus used to decouple processes, since it bridges or compensates for interruptions. By using such storages, the efficiency of a production line can be significantly increased.

PRIOR ART

Such a storage is shown in, for example, German patent specification DE 44 00 925 C2. According to this known system, the product series, coming from production, are fed to the intake of the storage by means of a loading belt. The series slide cyclically into the plate-like product carriers of the gondolas provided by the storage. To transport these gondolas, which carry the product series, a chain, which runs around chain wheels in pairs, carries out the function of a circular conveyor and conveys the loaded gondolas cyclically onward, is arranged in the intake area of the storage, and this onward conveyance can be directed upward or downward according to the type of storage. A similar arrangement is provided in the output area of the storage, so that the gondolas first arrive in the intake area, are conveyed upward after loading, from there reach a waiting position, the actual storage, and then, if required, are fed to the output station, and after emptying return to the intake station. For catching gondolas, each chain has catches which are arranged at fixed gaps. The minimum gap between successive catches is essentially determined by the dimensions of the gondola and the dimensions of the chain wheels. If the chosen gap between the catches is too small, the gondola which is guided over the chain wheel collides with the following gondola, since the gap between gondolas is reduced during the movement over the chain wheel.

In particular, it is an object of this invention to minimise the gap between successive vertically transported gondolas, and simultaneously to prevent a collision between the gondolas.

A further aspect of the task, on which this invention is based, can be seen in the fact that when the cyclically moving gondolas pass the upper deflections, they begin to swing slightly, and therefore the usually lightweight conveyed good slips or even falls out of the gondola.

Furthermore, since in the case of all traditional systems the necessary mechanism of the circulating chain lines is integrated on the left and right in steel constructions which are independent of each other, there are always, from one chain line to the other, associated, unavoidable imprecisions, resulting from the normal production and assembly tolerances (distortion), particularly in the case of wider systems. In the case of known intermediate storages, the chains of the chain pairs which work together have a common drive, and can therefore only be moved together. Because of this drive situation, which is located on one side, a mechanically resource-intensive and cost-intensive common drive of the two chain pairs which work together, by means of mitre gears, shafts and couplings, is unavoidable. A further object of this invention is to remove these disadvantages.

According to this invention, these aims are achieved, in particular, by the elements of the independent Claim 1. Other advantageous embodiments are found in the dependent claims and description.

In particular, the aims of the invention are achieved by the intermediate storage for storing unit goods including an intake station and an output station, which can be actuated independently of each other, by a storage section with variable receiving capacity being arranged between the intake station and the output station, by carrier plates to receive unit goods being present, the carrier plates which form a stack being collected on gondolas, in a conveying device to transport the carrier plates in circular movement through the intermediate storage, and by an intake elevator, which is provided in the region of the intake station, and an output elevator, which is provided in the region of the output station, being present respectively to form and to process the stacks which have accumulated in the storage sections, with a vertical conveyor provided for each of the intake station and the output station, each of which includes a chain pair which is provided with catches for the gondolas, each vertical conveyor being arranged around deflecting wheels at fixed locations. This intermediate storage includes a deflecting device with a drive and a push rod, a movably carried driven slide being arranged on the push rod, a deflecting element being movably carried at one end of the push rod, and being intended to engage as required with a switching profile which is arranged on an outer area of the gondola, to move the gondola into a slanting position to prevent a collision with the following gondola. The gondolas are preferably transported in succession in a vertical conveyor of the intermediate storage, engaging by means of a deflecting element of a deflecting device of the intermediate storage with a switching profile of the gondola, the gondola being carried rotatably on catches of the chains and on the deflecting elements, the deflecting element being moved preferably horizontally along a push rod of the deflecting device, and the gondola being moved into a slanting position and guided by means of the deflecting element a distance along the push rod, in such a way that the gondola is carried past the following gondola without a collision. After travelling the above-mentioned distance, the deflecting element is released from the switching profile and moved back, to be inserted into the switching profile of the following gondola. One of the advantages of the invention is that the gap between two successive gondolas can be kept as small as possible, to keep the gap between the last product series on a preceding gondola and the first product series on the following gondola at a minimum. What this achieves when gondolas are loaded at the intake station and unloaded at the output station is that in the vertical conveying of the gondolas the so-called gondola jump can be kept as small as possible or dispensed with completely. This means that for the jump from one gondola to the next the corresponding vertical conveyor must be briefly accelerated, since the gap between the two successive trays is usually greater than the tray gap within a gondola. By reducing the gap between adjacent gondolas, or shortening the gap between the corresponding catches on the conveyor chains, the gondola jump can be counteracted.

The described version of the invention results in moderation of the conveying process while loading and unloading products. Possible oscillations of the gondolas can be counteracted in this way. The clock rate for loading and unloading can also be increased. A further advantage of the invention is that dynamic, safe guidance of the rotatably suspended gondolas in the region of the upper chain deflections is made possible. In this way the gondolas can be passed to the upper accumulating conveyor in a vertically stable position, i.e. avoiding inhibiting oscillating movements. The unwanted oscillating movement is thus reliably prevented, and consequently the gap between adjacent gondolas, or the cam division on the circulating chains, as well as the diameter of the chain deflection, can be minimised. This brings speed and space advantages compared with known systems, where oscillation of the gondolas must be taken into account, and—if it cannot be corrected—causes considerable negative effects.

Thanks to the storage according to the invention, it is now also possible to guide the gondola, while it passes the upper chain deflection, in an angled position which can be arbitrarily chosen, so that collisions with an adjacent gondola can be prevented. It is a further advantage of the invention that it is possible to ensure that by means of the independently driven chains—which can be synchronised with each other—of a vertical conveyor, the deflection of a gondola for the purpose of preventing a collision can be guided at a precise angle over the appropriate deflecting wheels or chain wheels.

In a variant embodiment of the intermediate storage, the aims of the invention are achieved by the push rod being implemented as a single-axis linear drive, it being possible to guide the deflecting element along the lever stroke of the linear drive. One of the advantages of the invention is that by means of the linear drive, a flexible device is implemented, so that, for example, gondolas with small or large numbers of trays can be used to receive products or product series, and can be deflected.

In another variant embodiment of the intermediate storage, the aims of the invention are achieved by each chain pair of the two vertical conveyors having two parallel running chains, and each individual chain having a separate, mechanically independent drive, the conveying movement of the chains which work together within a chain pair being synchronously regulated, and the intermediate storage including a regulating device to capture level differences between the carrier plate to be loaded or unloaded and the transferring edge of the pushing-in or pushing-out conveyor, and to regulate the drives of the individual chains correspondingly.

One of the advantages of the invention is that the mechanically resource-intensive overdrive from one chain line to the other by means of mitre gears, shafts and couplings is omitted. Since the torque which occurs in the case of the proposed arrangement is received from two drive units in equal parts, even in dimensioning the transmission and motors, compared with traditional systems with one drive, drive units which are only half as large or half as expensive can be used. In all traditional systems, the necessary mechanism of the circulating chain lines on the left and right is integrated in mutually independent steel constructions; there are therefore necessarily always, in particular in the case of wider systems, imprecisions (distortion) from one side to the other. These imprecisions result from normal production and assembly tolerances. By the arrangement according to the invention, it is now possible to adjust the gondola at the intake or output of the storage absolutely horizontally to the required pushing-in or pushing-out level, because each side can be levelled independently of the other as precisely as required. It is thus possible to adjust the cam pairs to each other in such a way that the gondolas are positioned so that they are reproducibly aligned relative to the pushing-in or pushing-out level. In particular in the case of very flat products such as the above-mentioned confectionery, they must be pushed out with absolute precision. Thus in the case of the described variant embodiment of the invention, the above-mentioned resource-intensive and cost-intensive drive connecting the left-hand and right-hand chain lines is dispensed with. Furthermore, since according to the solution according to the invention the torque which occurs is received from two drive units in equal parts, even in dimensioning the transmission and servo motors, compared with traditional systems with one drive, drive units which are only half as large or considerably less expensive can be used.

In a further variant embodiment of the intermediate storage, the aims of the invention are achieved by the intermediate storage including signal emitters and/or signal receivers to capture level differences between the carrier plate to be loaded or unloaded and the transferring edge of the pushing-in or pushing-out conveyor, the signal emitters and/or signal receivers preferably being implemented as Hall sensors and/or magneto-resistive sensors and/or light barriers in the region of the pushing-in or pushing-out level. One of the advantages of the invention is that the arrangement according to the invention makes it possible to position the gondola to be loaded at the intake or unloaded at the output of the storage on the required pushing-in or pushing-out level, so that it is reproducibly aligned relative to the pushing-in or pushing-out level.

The invention also concerns a method of preventing collisions of gondolas of an intermediate storage, the gondolas being transported in succession in a vertical conveyor of the intermediate storage.

According to this method according to the invention, by means of a deflecting element of the intermediate storage, engagement with a switching profile of the gondola takes place, the gondola being carried rotatably on catches of the chains. The deflecting element is preferably moved horizontally along a push rod of the deflecting device, and the gondola is thus moved into a slanting position. After travelling a distance, the deflecting element is released from the switching profile and moved back, to be inserted into the switching profile of the following gondola.

Below, some embodiments of the intermediate storage according to the invention are described on the basis of the attached drawings.

Figure 1:
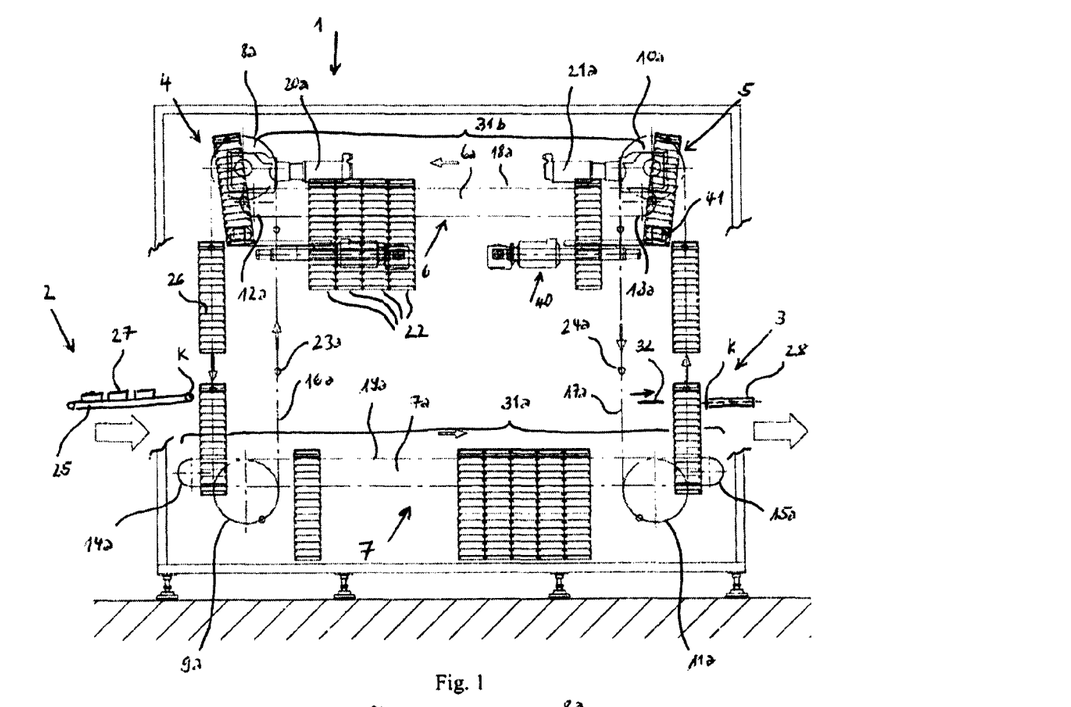
FIG. 1 shows a schematic representation of the method of functioning of an embodiment of the intermediate storage according to the invention.
Figure 2:
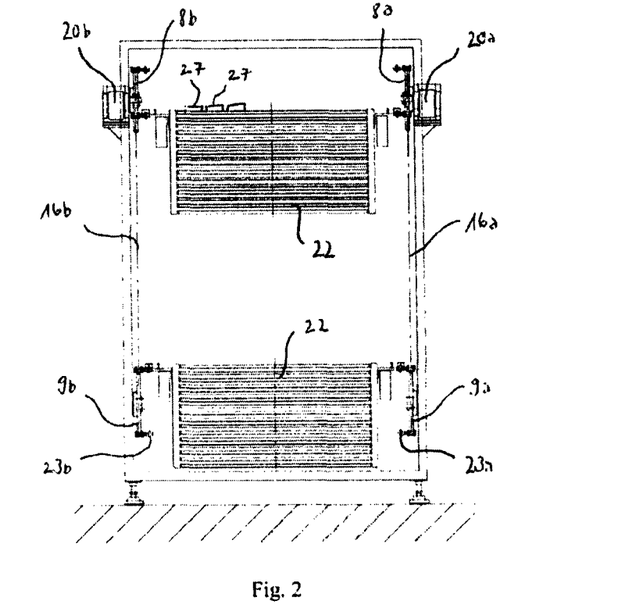
FIG. 2 shows a similar representation in a position rotated by 90°.
Figure 3:
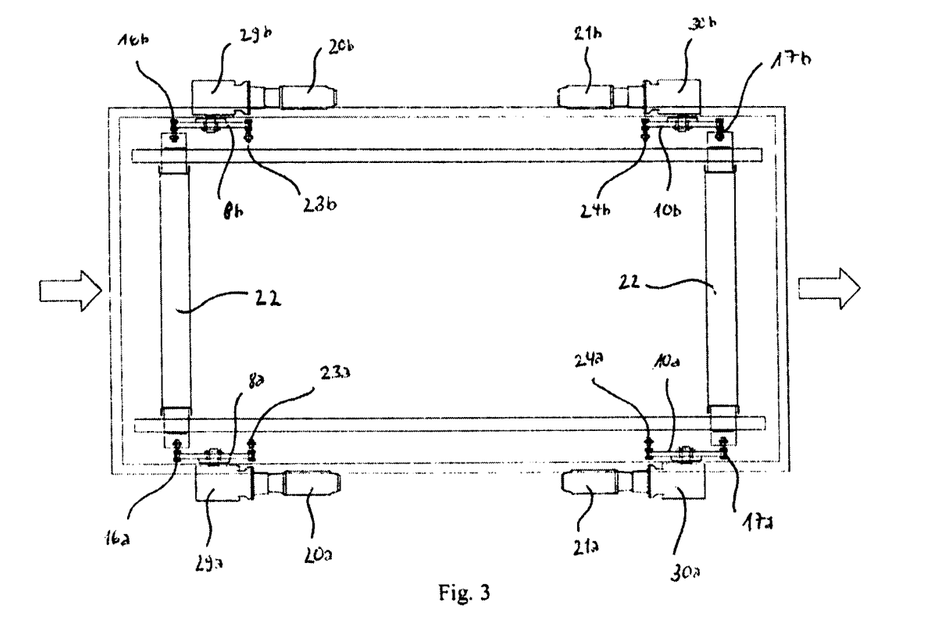
FIG. 3 shows a corresponding plan view.

FIG. 1 illustrates a device which can be used to implement the intermediate storage according to the invention. The intermediate storage, which is designated as a whole by 1 and works on the first-in-first-out principle, has an intake station 2 and an output station 3. At the intake station, the unit goods 27, e.g. chocolate bars, which are supplied on an intake conveyor 25, are fed to the carrier plates or trays 26 of a gondola 22 which is moved downward at the cadence of the intake conveyor 25. It is important that the receiving surface of the carrier plate 26 to be loaded is as precisely as possible at the height of the transferring edge K of the intake conveyor 25. The unit load series 27 then slide onto the provided carrier plates without problems.

The gondolas 22, which are moved from top to bottom by a vertical conveyor 4, hang from a paired circulating chain 16a, 16b, i.e. two chains 16a, 16b provided with catches or catch cams 23a, 23b at regular divisions are guided around chain wheels 8a, 8b and driven by a drive 20a, 20b. Each individual chain 16a, 16b of the vertical drive 4 is equipped with a separate drive 20a, 20b, and can thus also be controlled individually via its drive.

The practically identically constructed second vertical conveyor 5 moves the gondolas, which are unloaded at the output station 3, upward into the upper accumulating section 31b, by means of two conveyor chains 17a, 17b and catch cams 24a, 24b.

The catch cams 23a, 23b; 24a, 24b are arranged in alignment with each other, so that each gondola is as far as possible in a horizontal position at every instant of its conveying movement. Being suspended on the catch cams 23, 24, the gondolas 22 can be rotated around the catch cams on both sides, and are thus preferably carried so that they hang vertically.

As shown in particular in FIG. 1, the gondolas 22, which are loaded at the intake station, first move cyclically downward, and are passed there to the lower accumulating area 31a. After arriving in the accumulating area 31a, the gondolas are first conveyed onward individually at constant speed in the direction of the output, where they run into the accumulation. This accumulating area 31a similarly has two parallel conveyor chains 19a, 19b, which themselves are guided around chain wheels 14a, 14b and 15a, 15b. The thus formed horizontal conveyor, which is designated as a whole by 7, now takes over the gondolas 22 which the vertical conveyor 4 supplies; in this case the catch cams 23 of the chains 16a, 16b avoid the conveying level of the accumulating area 31a, and thus release themselves from the catch function of the chains 16a, 16b. The filled gondolas 22 now hang on the chains 19a, 19b which are driven via the chain wheels 14a, 14b, and can be called up from this accumulating area 31a as required.

At the end of this accumulating area 31a, the gondolas 22 are taken over by a vertical conveyor 5, which moves them cyclically upward. The vertical conveyor 5 also has two conveyor chains 17a, 17b which are provided with separate drives 21a, 21b, and which are similarly provided with catch cams 24a/24b which are aligned with each other. On these cam pairs 24a, 24b at regular divisions on the chains 17a, 17b, the gondolas 22 are now lifted out of the lower accumulation area 31a, then to be moved in working cadence to the level of the transferring edge K of the pusher-out 32. The pushing-out can either done frontally, i.e. in the direction of movement of the pusher 32 shown by an arrow, and/or at a lower, lateral pushing-out level (not shown), each pushing-out level being able to serve an independent packing line.

The emptied gondolas 22 are now moved upward in working cadence by the circulating chain pair 17a, 17b, and there reach the upper accumulating area 31b via the upper chain wheels 10a, 10b. This means that the gondolas hanging on the catch cams 24a, 24b are deflected via the upper chain wheels 10a, 10b and then lowered to the conveying level of the accumulating area 31b. A horizontal conveyor 6, which also has two chains 18a, 18b, then brings the empty gondolas 22 to the vertical conveyor 4, at which point the gondolas are captured by the catch cams 23, and after passing the chain wheels 8a, 8b which cause the deflection are captured by the chains 16a, 16b of the vertical conveyor 4, to reach the intake station 2 again.

An essential feature of the described intermediate storage is, as already mentioned, the fact that the vertical sections of the conveying circuit each have two chains 16 and 17 which work together, are driven separately and can also be controlled separately, and each form a circular conveyor. The associated drives 20a, 20b and 21a, 21b are in any case independent individual drives, preferably in the form of geared motors. Thus each of the four circulating chains of the vertical conveyors 4 and 5 is provided with a separate drive unit.

Figure 10:
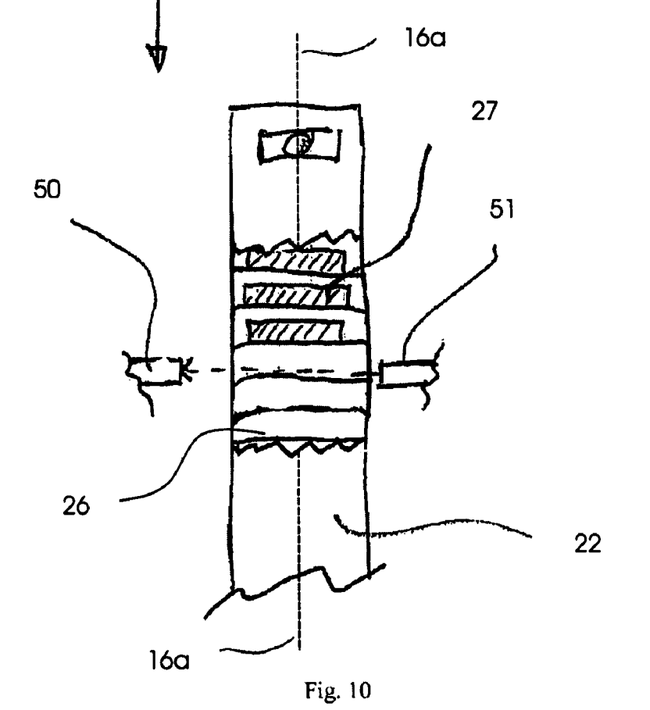
FIG. 10 shows a schematic representation of a gondola, with appropriate sensors to capture the level difference between a transferring edge arranged in the intake or output station and a carrier plate adjacent to it.
Figure 11:
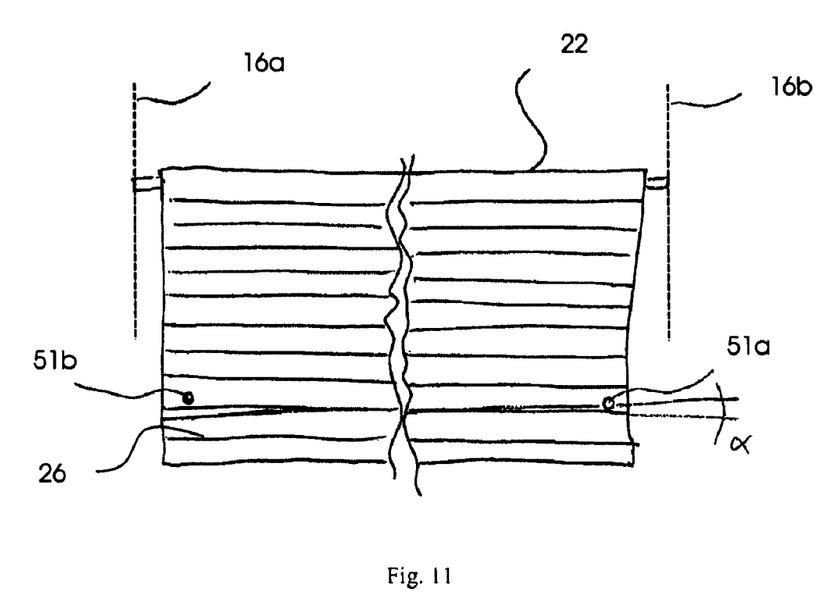
FIG. 11 shows a similar representation in a position rotated by 90°.

The required synchronicity of the chains forming a chain pair can be achieved by control technology as follows: The schematically simplified representation of FIGS. 10 and 11 shows sensor modules 50 and 51, by means of which any level differences between a carrier plate 26 and the transferring edge K of the conveyor 25 (shown in FIG. 1) can be determined at the intake station 2. The angle $\alpha$ shown in FIG. 11 is a measure for the level difference or angle of inclination of the gondola. In the ideal case, this angle equals zero, so that the conveyor 25 pushes out the unit load which is supplied to it with reproducible precision via the transferring edge K onto the adjacent carrier plate 26 of the gondola, or, with an identical device, at the intake station the unit load 27 is deposited from the conveyor 25 onto the corresponding carrier plate 26. On the output side 3, on the one hand the transferring edge K is directed exactly onto the level of the carrier plate 26 to be unloaded, whereas simultaneously the level of the latter must be aligned onto the conveying level of the carrying-out conveyor 28.

What this achieves is that the unit load, e.g. pastries, can be pushed onto the conveyor 28 without breaking. The difference value which is determined by the sensor modules 50 and 51 is transmitted to the drives 20a, 20b; 21a, 21b of the individual chains 16a, 16b and 17a, 17b, so that the required level adjustment takes place immediately after it is determined. The level can be regulated separately for each individual carrier plate 26. The signal emitters and signal receivers can be in the form of Hall sensors and/or magnetoresistive sensors and/or light barriers.

Figure 7:
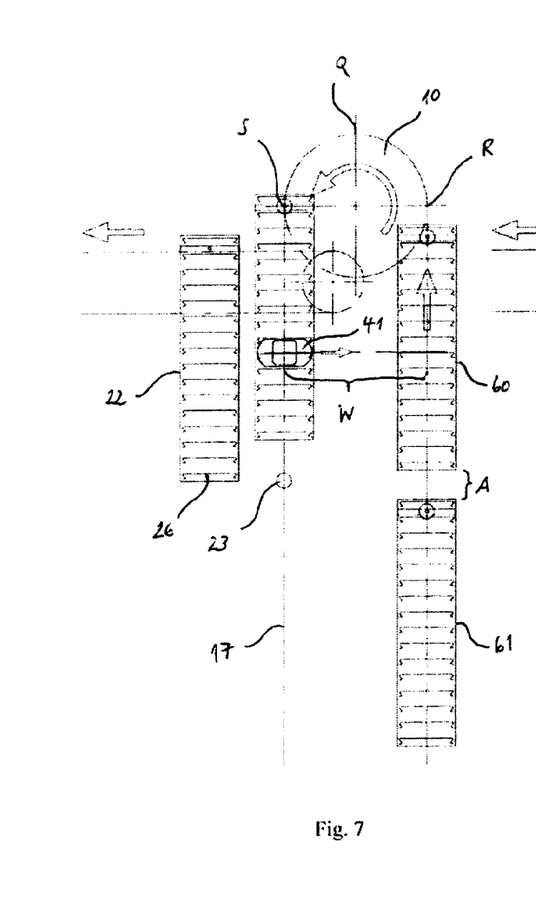
FIG. 7 shows a schematic representation of the gondolas shortly before the upper deflecting section is passed, in a side view of the output station.
Figure 8:
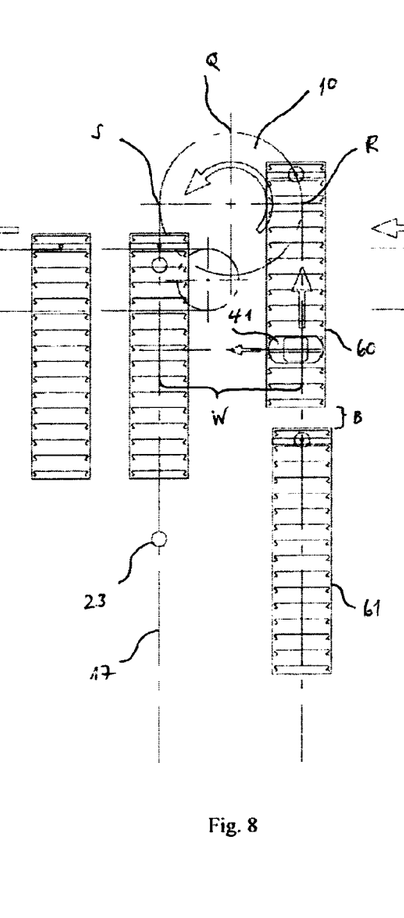
FIG. 8 shows the same gondolas in a further operating phase, after the vertical conveyor has travelled a short distance.

FIG. 7 shows a chain wheel 10 at the top of a vertical conveyor of the intermediate storage according to the invention. FIG. 7 shows the initial position of two successive gondolas 60 and 61, which are transported by the vertical conveyor 5 (FIG. 1) vertically upward. The gap A between the gondolas 60 and 61 is preferably kept to a minimum. FIG. 8 shows, among other things, the gondolas 60 and 61, which have been transported a short distance further by the vertical conveyor 5 along the chains 17a, 17b on catches 23. The gondola 60 has passed through the rolling-up point R of the chain wheel 10, and rests on the chain wheel. The previous distance A between the lower edge of the gondola 60 and the upper edge of the following gondola 61 was thus reduced to the distance B.

Figure 4:
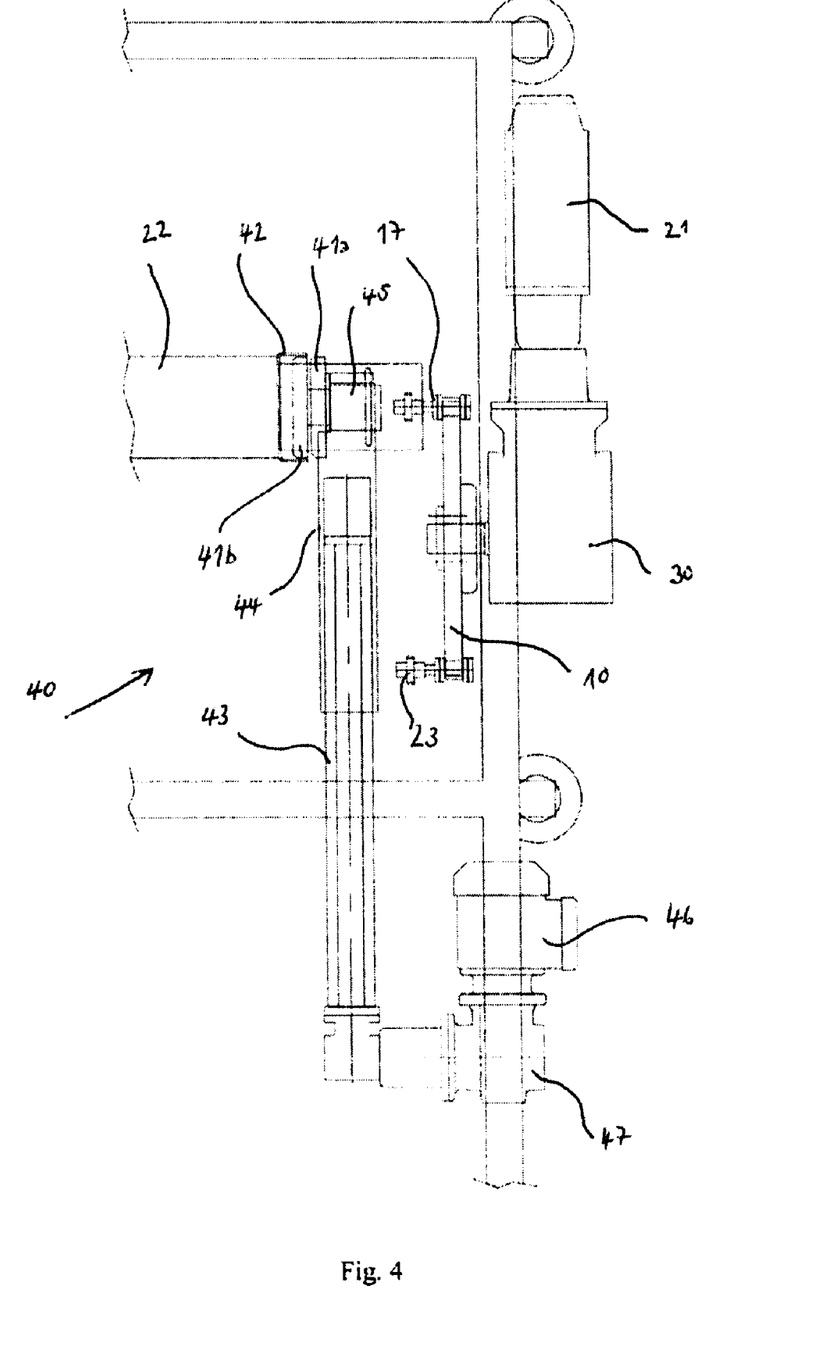
FIG. 4 shows, as a detail of the plan view, a schematic representation of a deflecting device.
Figure 5:
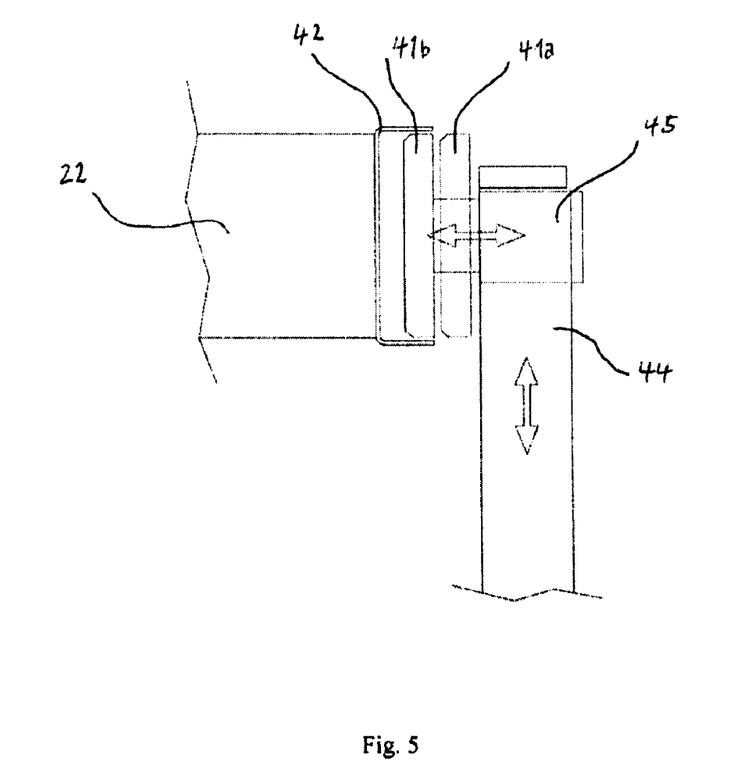
FIG. 5 shows a detail of FIG. 4.
Figure 6:
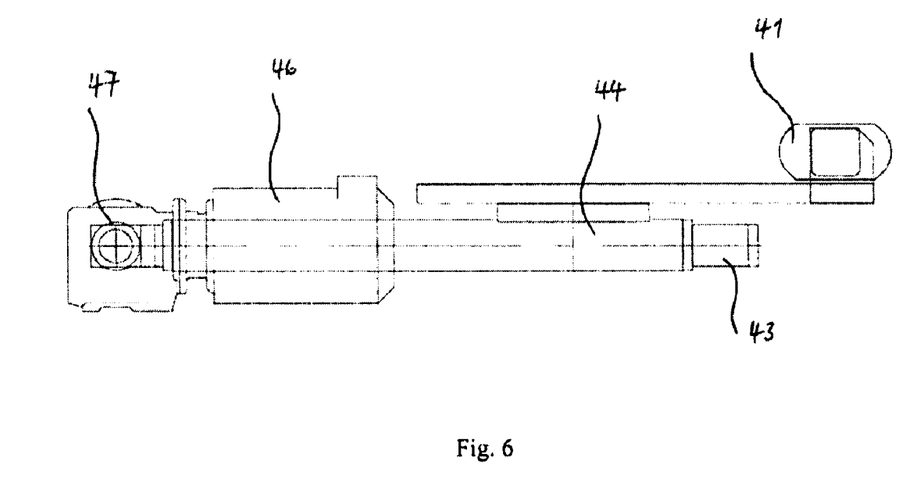
FIG. 6 shows a similar representation to FIG. 4 in a position rotated by 90°.
Figure 9:
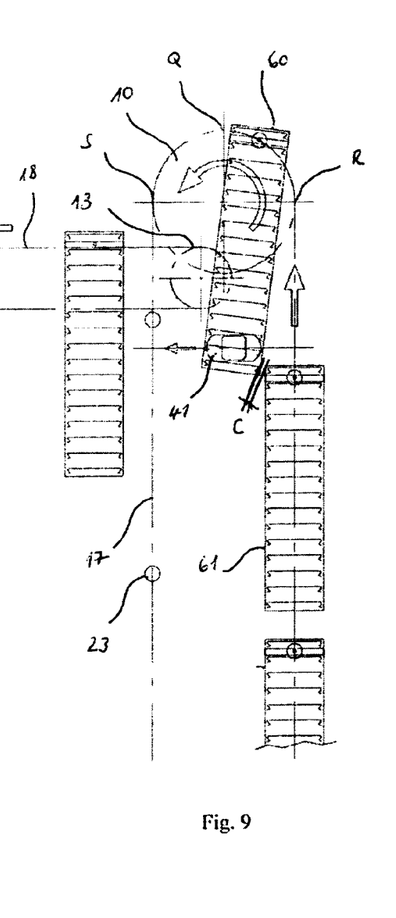
FIG. 9 shows the same gondolas after the gondola passing the deflecting section has been deflected to take account of the following gondola.

The gondola 60 must now be moved horizontally relative to the gondola 61. To prevent a collision between the gondolas 60 and 61, which are transported in succession in the vertical conveyors 4, 5 of the intermediate storage 1, the preceding gondola must be moved into a slanting position. For this purpose, according to FIGS. 4 to 6, the deflecting element 41 of a deflecting device 40 of the intermediate storage 1 engages with the U-shaped cross-section of a switching profile 42 of the gondola. The U-shaped switching profile 42, which is arranged on the gondola 22, is used to receive temporarily the deflecting element 41, which slides in the switching profile 42 as it moves and shifts the gondola sideways, i.e. out of its vertical position (FIG. 7) into the slanting position according to FIG. 9. The deflecting element 41, which is carried rotatably on the front part of a slide 44 (FIG. 5), as the gondola 22 enters the deflection curve (FIG. 7), penetrates the U-shaped switching profile 42 which is attached in a fixed position to the lengthways side of the gondola, and accompanies it on its deflection path to the opposite side of the latter. The actual deflection is caused by a drive motor 46 which is provided with a transmission 47, and the movement of which is transmitted via change lever 43, slide 44 and lifting cylinder 45 onto the deflecting element 41. The gondola 60, which is carried rotatably on catches 23, 24 of the chains 16a, 16b; 17a, 17b, is thus guided by the deflecting elements 41, for as long as it is in the region of the deflecting section. Preferably, the deflecting elements which are inserted on both sides of the gondola 60 are inserted into the appropriate switching profile 42, until the gondola 60 has reached the rolling-off point S, where the deflecting element 41 is then removed or released from the switching profile 42. If the deflecting element 41 was released from the switching profile 42 while the gondola 60 was still guided over the chain wheels, the gondola could begin to swing or wobble. The deflecting element 41 is preferably moved horizontally along the push rod 43 of the deflecting device 40, the gondola 60 being moved into a slanting position, in such a way that the distance designated by C in FIG. 9 is great enough to guide the gondola 60 past the gondola 61 without a collision. Simultaneously, what the putting into a slanting position achieves is that the gondola 60 is guided stably and without swinging over the chain wheels.

The deflecting element 41, the outlines of which are somewhat adapted to the switching profile, is on the one hand carried so that it moves lengthways on the slide 44 and connected to a drive 46, 47, whereas it can also be moved by the lifting cylinder 45 into the switching profile 42, or—after bypassing the deflecting section—moved out of the latter. When the deflecting section, which is specified by the deflecting wheel, is passed, the gondola is first deflected out of its initial vertical position, to make space for the front section of the following gondola; as soon as the gondola has passed the deflecting wheel to a large extent, the deflecting element 41 is pulled continuously back out of the switching profile, so that the gondola can take its vertical position again. Thanks to this temporary deflection of the gondolas, the gap between the gondolas can be kept very small.

In the deflection, the deflecting element 41, which is carried on the push rod 43 so that it can move lengthways, preferably moves a distance W back along the push rod 43. As soon as the gondola 60 has reached the rolling-off point S, the deflecting element 41 can be removed or released from the switching profile 42. Via the slide 44, which is provided with a drive 47 and held on the push rod 43, the deflecting element 41 is moved back, to be inserted into the switching profile 42 of the following gondola 51. The deflecting element 41, which is proposed for the output station 3, can be used correspondingly for the intake station 2. In this case the possible collision between a gondola which is guided over the chain wheel of the vertical conveyor 8 and the preceding gondola which is transported vertically downward can be prevented.

REFERENCE SYMBOL LIST 1 intermediate storage
2 intake station
3 output station
4 vertical conveyor
5 vertical conveyor
6 horizontal conveyor
7 horizontal conveyor
8 chain wheel
9 chain wheel
10 chain wheel
11 chain wheel
12 chain wheel
13 chain wheel
14 chain wheel
15 chain wheel
16 chain
17 chain
18 chain
19 chain
20 drive
21 drive
22 gondola
23 catch, catch cam
24 catch, catch cam
25 conveyor
26 carrier plate
27 unit load
28 conveyor
29 transmission
30 transmission
31 storage section
32 pusher
40 deflecting device
41 actuating device
42 switching profile
43 push rod
44 slide
45 lifting rod
46 drive
47 transmission
50 sensors
51 sensors
60 gondola
61 gondola
A gap
B gap
C gap
K edge
Q vertex
R rolling-on point
S rolling-off point
α angle

The invention claimed is:
1. An intermediate storage for storing unit goods, comprising:
 an intake station and an output station, which can be actuated independently of each other;
 a storage section with variable receiving capacity arranged between the intake station and the output station;
 carrier plates to receive unit goods, the carrier plates forming a stack being collected on gondolas; and
 a conveying device to transport the carrier plates in a circular movement through the intermediate storage, including an intake elevator, provided in a region of the intake station, and an output elevator, provided in a region of the output station, respectively to form and to process stacks that have accumulated in the storage sections, the conveying device including a vertical conveyor provided for each of the intake station and the output station, each of which includes a chain pair including catches for the gondolas, each vertical conveyor being arranged around deflecting wheels at fixed locations, wherein the intermediate storage includes a deflecting device including a drive and a push rod, a movably carried driven slide being arranged on the push rod, and a deflecting element is movably carried at one end of the push rod, and is configured to engage as required with a switching profile arranged on an outer area of the gondola, to move the gondola into a slanting position to prevent a collision with a following gondola.

2. An intermediate storage according to claim 1, wherein the push rod is implemented as a single-axis linear drive, configured to guide the deflecting element along a lever stroke of a linear drive.

3. An intermediate storage according to claim 1, wherein each chain pair of the two vertical conveyors includes two parallel running chains, and each individual chain includes a separate, mechanically independent drive, and conveying movement of the chains that work together within a chain pair are synchronously regulated, and the intermediate storage includes a regulating device to capture level differences between the carrier plate to be loaded or unloaded and a transferring edge of the pushing-in or pushing-out conveyor, and to regulate the drives of the individual chains correspondingly.

4. An intermediate storage according to claim 1, wherein the intermediate storage includes signal emitters and/or signal receivers to capture level differences between the carrier plate to be loaded or unloaded and a transferring edge of the pushing-in or pushing-out conveyor, the signal emitters and/or signal receivers implemented as Hall sensors and/or magneto-resistive sensors and/or light barriers in a region of the pushing-in or pushing-out level.

5. A method of preventing collisions of gondolas of an intermediate storage according to claim 1, the gondolas being transported in succession in a vertical conveyor of the intermediate storage, by a deflecting element of a deflecting device of the intermediate storage, engagement with a switching profile of the gondola takes place, the gondola being carried rotatably on catches of the chains and on the deflecting elements, and the deflecting element is configured to be moved horizontally along the push rod of the deflecting device, the gondola being moved into a slanting position, the gondola is guided by the deflecting element for a distance along the push rod, such that the gondola is guided past the following gondola without collision, and after travelling a predetermined distance, the deflecting element is released from the switching profile and moved back, to be inserted into the switching profile of the following gondola.

* * * * *